US006618716B1

(12) United States Patent
Horvitz

(10) Patent No.: US 6,618,716 B1
(45) Date of Patent: Sep. 9, 2003

(54) COMPUTATIONAL ARCHITECTURE FOR MANAGING THE TRANSMITTAL AND RENDERING OF INFORMATION, ALERTS, AND NOTIFICATIONS

(75) Inventor: Eric Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/365,287

(22) Filed: Jul. 30, 1999

(51) Int. Cl.[7] .................................................. G06N 5/00
(52) U.S. Cl. ........................................... 706/55; 706/20
(58) Field of Search .................... 706/55, 20; 351/224; 600/587; 709/206

(56) References Cited

U.S. PATENT DOCUMENTS

| 4,971,434 | A | * | 11/1990 | Ball ............................ 351/224 |
| 5,617,526 | A | | 4/1997 | Oran et al. |
| 5,864,848 | A | | 1/1999 | Horvitz |
| 6,021,403 | A | | 2/2000 | Horvitz |
| 6,267,733 | B1 | * | 7/2001 | Peterson et al. ............. 600/587 |
| 2002/0038294 | A1 | * | 3/2002 | Matsugu ....................... 706/20 |
| 2003/0014491 | A1 | * | 1/2003 | Horvitz et al. ............... 709/206 |

FOREIGN PATENT DOCUMENTS

WO    WO 98 25195 A    6/1998

OTHER PUBLICATIONS

U.S. patent application Ser. No. 09/007,894, Horvitz, A Technique for Prefetching . . . , filed Jan. 15, 1998.
U.S. patent application Ser. No. 09/055,477, Methods and Apparatus for . . . , filed Apr. 6, 1998.
Smith, Agent function for viewpoint–like interfaces, Xerox disclosure journal, vol. 19, No. 6, Nov. 1, 1994, p. 481.

IBM Technical Disclosure Bulletin, Method of rule–based file, window, and message processing, vol. 38, No. 7, Jul. 1, 1995.
Visual Warbling to subtly indicate status conditions, IBM Technical Disclosure Bulleting, vol. 41, No. 1, 1998, pp. 611–613.
J. Breese, D. Heckerman, & C. Kadie (1998). Empirical Analysis of Predictive Algoirthms for Collaborative Filtering. In Proceedings of the Fourteenth Conference on Uncertinaty in Artificial Intelligence, pp. 43–52. AUAI, Morgan Kaufmann, San Francisco.

(List continued on next page.)

Primary Examiner—Wilbert L. Starks, Jr.
(74) Attorney, Agent, or Firm—Amin & Turocy, LLP

(57) ABSTRACT

An architecture for managing alerts, notifications, and peripheral information is disclosed. In one embodiment, a computerized system includes three modules, an attentional status module, a peripheral information notification and alerts module, and an notifications decision-making module. The attentional-status module generates a probability distribution over the user's focus of attention. In one embodiment the module also provides a probability distribution over the period of time until the user will become available to review alerts zero or minimal cost, or will review them without prompting. In one embodiment, this module utilizes a decision-theoretic analysis to identify ideal actions about the timing and rendering of notifications or alerts. The peripheral information notification and alerts module receives alerts from different sources, including the operating system, standard applications, special plug-ins designed to work with the architecture, and, in particular embodiments, from special sensory apparatus including ambient acoustical information. The notification decision-making module is to alert the user of the alerts received by the peripheral information notification and alerts module, based on the probability generated by the attentional status module.

37 Claims, 7 Drawing Sheets

OTHER PUBLICATIONS

M. Czerwinski, S. Dumais, G. Robertson, et al. (1999). Visualizing implicit queries for information management and retrieval. In Porceedings of CHI '99, ACM SIGCHI Conference on Human Factors in Computing Systems, Pittsburgh, PA, pp. 560–567, Association for Computing Machinery.

S. Dumais, J. Platt, D. Heckerman, M. Sahami (1998). Inductive learning algorithms and representations for text categorization. In Prceedings of the Seventh International Conference on Information and Knowledge Management, pp. 148–155. Association for Computing Machinery, ACM Press, New York.

E. Horvitz (1999). Principles of mixed–initiative user interfaces. In Proceedings of CHI '99, ACM SIGCHI Conference on Human Factors in Computing Systems, Pittsburgh, PA, pp. 159–166. Association for Computing Machinery.

E. Horvitz, M. Barry (1995). Display of information for time–critical decision making. In Proceedings of the Eleventh Conference on Uncertinaty in Artificial Intelligence, pp. 296–305 Montreal, Canada. Morgan Kaufmann, San Francisco.

E. Horvitz, J. Breese, D. Heckerman, D. Hovel, K. Rommelse (1998). The Lumiere project: Bayesian user modeling for inferring the goals and needs of software users. In Proceedings of the Fourteenth Conference on Uncertainty in Artificial Intelligence, pp. 256–265. Morgan Kaufmann, San Francisco.

E. Horvitz and G. Rutledge (1991). Time–dependent utility and action under uncertainty. In Proceedings of Seventh Conference on Uncertainty in Artificial Intellignece, Los Angeles, CA, pp. 151–158. Morgan Kaufmann, San Francisco.

E. Horvitz and A. Seiver (1997). Time–critical action: Representations and application. In Proceedings of the Thirteenth Conference on Uncertainty in Artificial Intelligence (UAI–97), pp. 250–257 Providence, RI. Morgan Kaufmann, San Francisco.

D. Koller, M. Sahami (1996). Toward optimal feature selection. In Proceedings of Thirteenth Conference on Machine Learning, pp. 284–292, Morgan Kaufmann, San Franicsco.

H. Leiberman (1995). An agent that assist web browsing. In Proceedings of IJCAI–95, Montreal Canada. Morgan Kaufmann, San Francisco.

J. Platt (1999). Fast training of support vector machines using sequential minimal optimzation. In Advances in Kernal Methods: Support Vector Learning. MIT Press, Cambridge, MA.

J. Platt (1999). Proobabilistic outputs for support vector machines and comparison to regularized likelihood methods. In Advances in Large Margin Classifiers, MIT Press, Cambridge, MA.

M. Sahami, S. Dumais, D. Heckerman, E. Horvitz (1998). A Bayesian approach to filtering junk e–mail. In Workshop on Learning for Text Categorization, AAAI Technical Report WS–98–05. American Association for Artificial Intelligence, AAAI.

* cited by examiner

COMPUTATIONAL ARCHITECTURE FOR MANAGING THE TRANSMITTAL AND RENDERING OF INFORMATION, ALERTS, AND NOTIFICATIONS

RELATED APPLICATIONS

This application is related to the cofiled, copending and coassigned applications entitled "Integrated a Computer-Based Message Priority System with Mobile Electronic Devices" Ser. No. 09/365,293, "Methods for Routing Documents based on a Measure of Criticality" Ser. No. 09/364,528, "Methods for Display, Notification, and Interaction with Prioritized Messages" Ser. No. 09/364,522, and "Method for Automatically Assigning Priorities to Documents and Messages" Ser No. 09/364,527.

FIELD OF THE INVENTION

This invention relates generally to notifications and alerts received or generated by devices such as computers, and more particularly to an architecture for managing such alerts.

BACKGROUND OF THE INVENTION

The typical computer user is faced with notifications and alerts generated from many different sources. For example, an operating system may notify the user that the system is running low on memory. An electronic mail program may notify the user that he or she has received new electronic mail. A calendaring program may notify the user that he or she has an upcoming appointment. A software application may infer that a user might benefit from some assistance. A electronic news or business service may be decide that a user might like to review some information about a development in the world.

Generally, within the prior art, the user is made aware of each alert about different forms of information on an ad hoc basis, by the generating program. For example, the user may be in the middle of an important video conference taking place on the computer, yet the electronic mail program usually will dutifully alert the user to new email received—even if is junk mail, and even if the user would rather not receive such alerts because of the importance of the conference. While the user may or may not be able to change alert preferences in an individual program, he or she generally is not able to set preferences that affect all programs, system-wide, and furthermore many programs do not allow the changing of such preferences. Beyond the lack of an ability to centrally control alerts, there is a lack of methods that consider dynamically the urgency or importance of notifications and that can weigh the value of transmitting the information with the potential context-sensitive costs to the user in terms of the distraction, obstruction of limited screen real estate associated with the rendering of visual or audio notifications. Such costs can be dependent on the context, including the user's current location (office vs. offsite location for user's with mobile computing or paging devices), the current task at hand, and current overall focus of attention. Methods have not been available for personal computing and communications systems that have the ability to intelligently balance the value of speedy transmittal of a notification (or the costs of delaying the notification of users) with the cost of notifying users.

The situation of being faced with an intermittent stream of messages from multiple applications and messages is only likely to get worse, as the computer becomes a convergence appliance, and other devices, such as telephones, pagers, televisions, appliances, etc., communicate through the computer. For example, a telephone may alert the user to an incoming call, including the phone number of the call, while a television may alert the user to a show that he or she had previously indicated was important to watch. Thus, the user potentially faces a situation where he or she is constantly distracted by such alerts.

For these and other reasons, there is a need for the present invention.

SUMMARY OF THE INVENTION

The invention relates to an architecture for managing alerts. In one embodiment, a computerized system includes several modules and application interfaces, including an attentional-status module, a peripheral information notification and alerts module, and a notification decision making module. The notification decision making module in some embodiments can be further decomposed into a distinct rendering module. Such a system also provides in one embodiment a specific set of interfaces that allows multiple applications to publish their presence and functionality and subscribe to the architecture.

The attentional-status module continues to infer the probabilities of alternative states of attention of the user based on the monitoring of events generated or influenced by the user's behavior and consideration of other important evidence, including the user's calendar and time of day. In another embodiment, the module simply generates the probability that the user is currently in a state where he or she is either actively interested in reviewing alerts or becomes "available" to receive a notification with zero or minimal cost. As shorthand, the probability of being available for reviewing alerts with minimal cost is also referred to as the user-availability probability. In one embodiment, in addition to the probability distribution over the focus of attention or over the availability of the user, the attentional status module also infers a probability distribution over the period of time until the user becomes available for reviewing alerts with minimal cost. In one embodiment, this module utilizes a probabilistic model such as a Bayesian network model to infer the probabilities of alternate states of attention, the availability probability, or the probability over the period of time until the user becomes available for reviewing alerts at minimal cost.

The peripheral information notification and alerts module is to receive information, notifications, and alerts, for example, in one embodiment, from a set of application programs running on a computer, as well as from external devices such as telephones, televisions, etc. The notification decision-making module makes decisions about how, if, and when to alert the user about the information and alerts received by the peripheral information notification and alerts module, based on the probabilities generated by the attentional status module about the likelihood of alternate states of attention. In one embodiment, the system employs a decision-theoretic analysis about how and when to render an alert based on a consideration of the expected costs of interrupting the user by considering the costs of interruption for each of the possible states of attentional focus and the likelihood of each of the states. In one embodiment, this module determines the manner by which the user is alerted—for example, in an audio or visual manner, or on a mobile device such as a cell phone or a pager.

Embodiments of the invention provide for advantages over the prior art. A user, for example, is not confronted with different alerts made in different manners ad hoc by different sources (e.g., programs or devices). Rather, alert management is centralized and is guided by policies derived from knowledge about costs or preferences. Furthermore, in one embodiment, the expected value of transmitting an alert determines whether the user desires to be alerted, based on what the user is currently doing, for example, on the current sensed activity and his or her prior history of responding to alerts. The importance of the alerts also can determine whether the user is alerted. Finally, the notification decision-making module ensures that alerts are presented to the user in a consistent manner, regardless of the source of the alerts, and can decide in one embodiment the manner of the alert based on its importance—for example, a salient visual and audio alert in the case of an extremely important alert, and a pleasant, low volume audio-only alert in the case of a low-priority alert.

Embodiments of the invention include computer-implemented methods, computer-readable media, mobile paging and communication systems, and, more generally, computerized systems of varying embodiments. Still other embodiments, advantages and aspects of the invention will become apparent by reading the following detailed description, and by reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
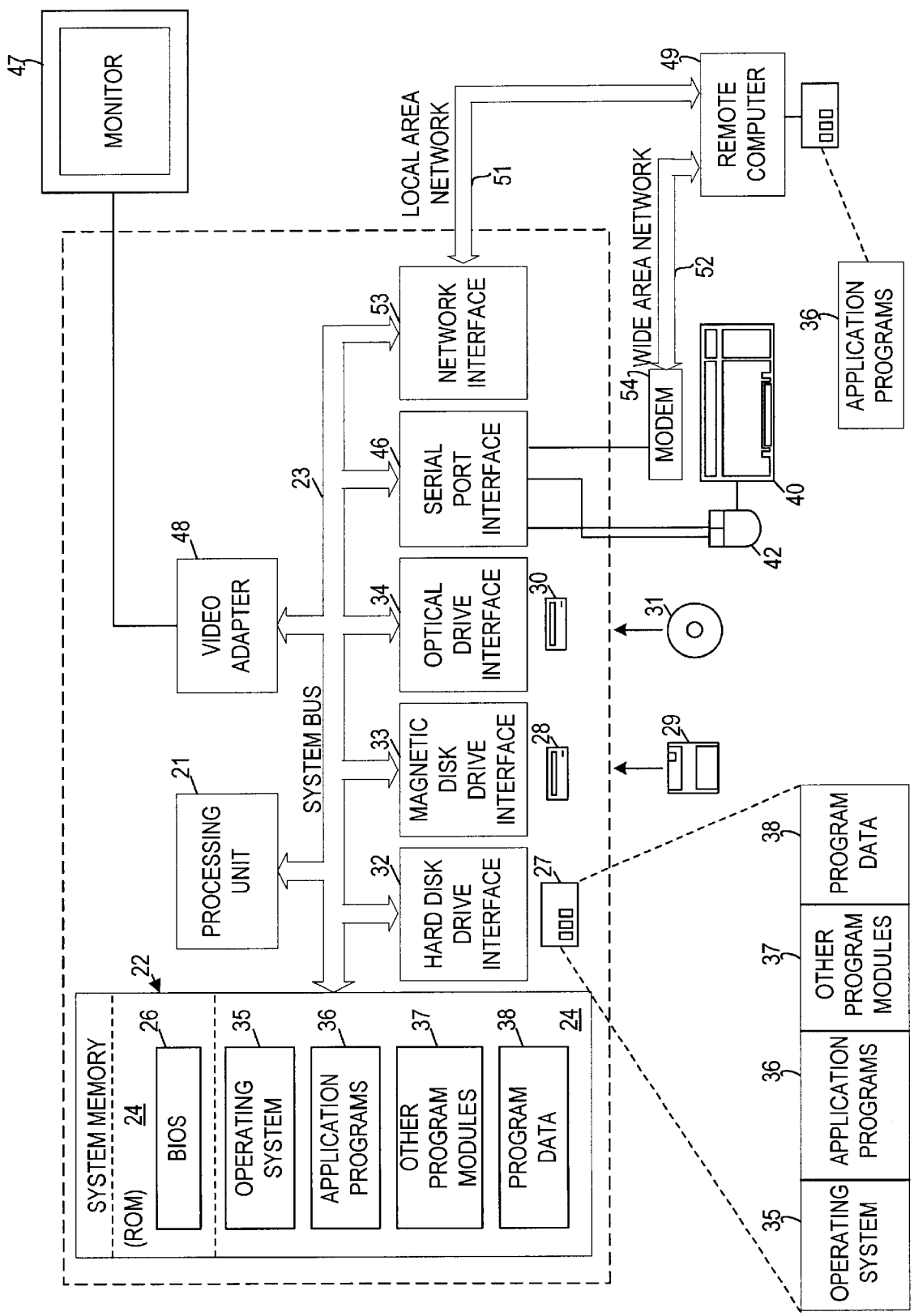
FIG. 1 is a diagram of an operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

System

Figure 2:
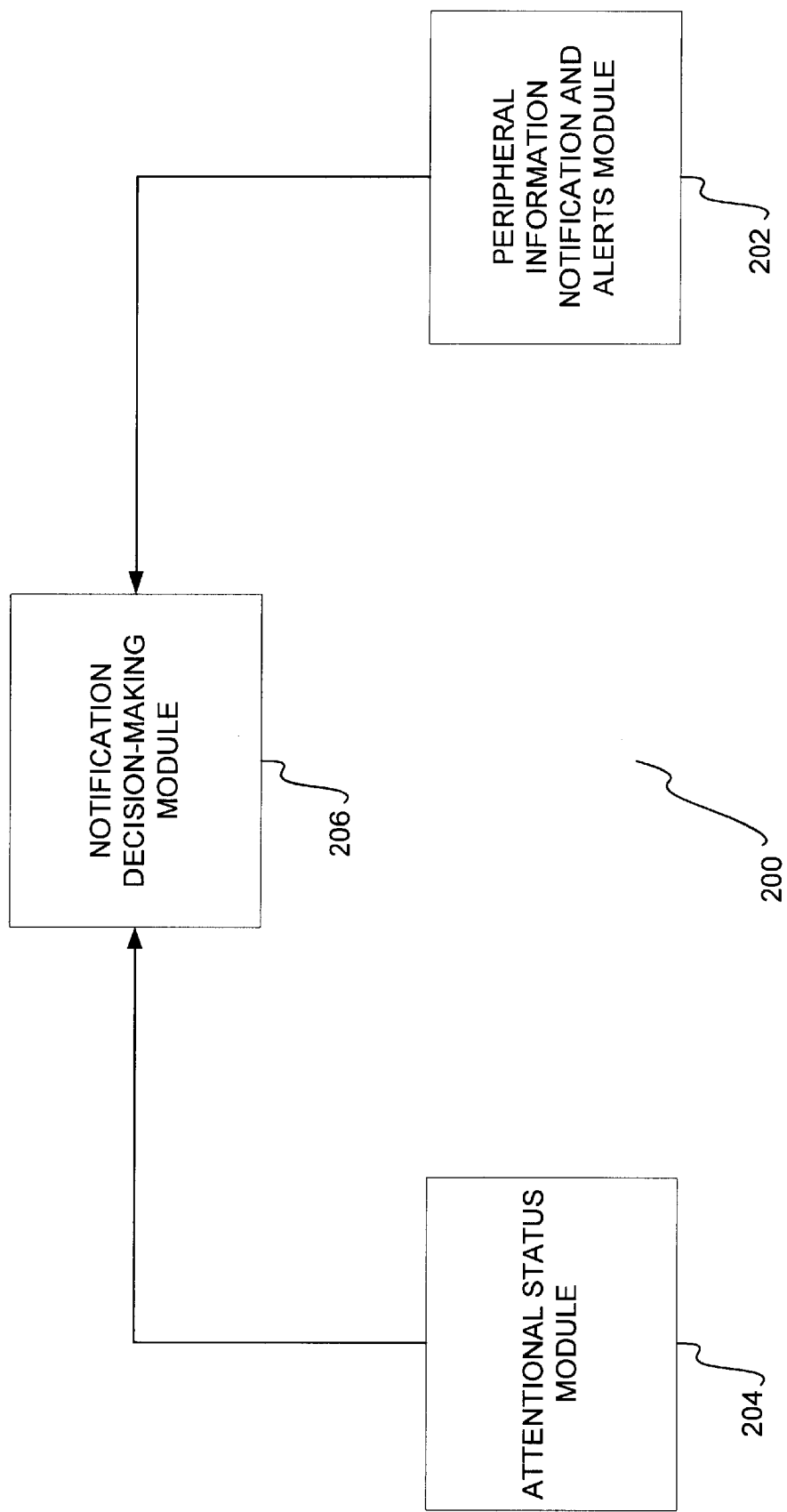
FIG. 2 is a diagram of a system according to an embodiment of the invention.

In this section of the detailed description, description is provided of a system according to an embodiment of the invention. The description is made with reference to FIG. 2, which is a diagram of a system according to an embodiment of the invention. Referring now to FIG. 2, the system 200 includes three modules, a peripheral information notification and alerts module 202, an attentional status module 204, and a notifications decision-making module 206. Each of these modules can in one embodiment be implemented as a computer program executed by a processor of a computer, such as the computer described in the preceding section, from a computer-readable medium, such as a memory or a hard disk drive, of a computer. The invention is not so limited, however.

Each of the modules 202, 204 and 206 is described first in general terms, and then more specifically. The attentional status module 204 generates one or more probabilities (for example, a probability distribution), which in one embodiment can be defined as the probability that the user is receptive to receiving an alert. For purposes of generality, the one or more probabilities generated by the module 240 may be referred to as a "probability" or the plural "probabilities"; however, it is understood that this is for shorthand purposes only, and that the application applies to either case—one probability, or many probabilities. In one embodiment, the module 204 utilizes a probabilistic model to generate a probability. The peripheral information notification and alerts module 202 receives alerts. For example, in one embodiment, the module 202 receives alerts from computer programs running on a computer, including application programs, operating systems, etc., as well as from external devices such as telephones, televisions, etc. The invention is not so limited. Both of these modules 202 and 204 are operatively and/or communicatively coupled to the notification decision-making module 206. The notifications decision-making module (also referred to as the notifications management module) 206 alerts the user of the alerts received by the module 202, based on the inferred probabilities of different states of attention of the user generated by the module 204. In one embodiment, the module 206 determines the manner by which the user is alerted, such as in an audio and/or visual manner.

Each of the modules 202, 204 and 206 is now described in more detailed.

Attentional Status Module

In this section of the detailed description, the attentional status module of the system is described in more detail, according to one embodiment of the invention. The description is made with reference to FIG. 3, which is a diagram of the attentional status module 204 shown in more detail, according to one embodiment of the invention, and FIG. 4, which is a diagram of a Bayesian model of a user's focus of attention, according to one embodiment of the invention.

Figure 3:
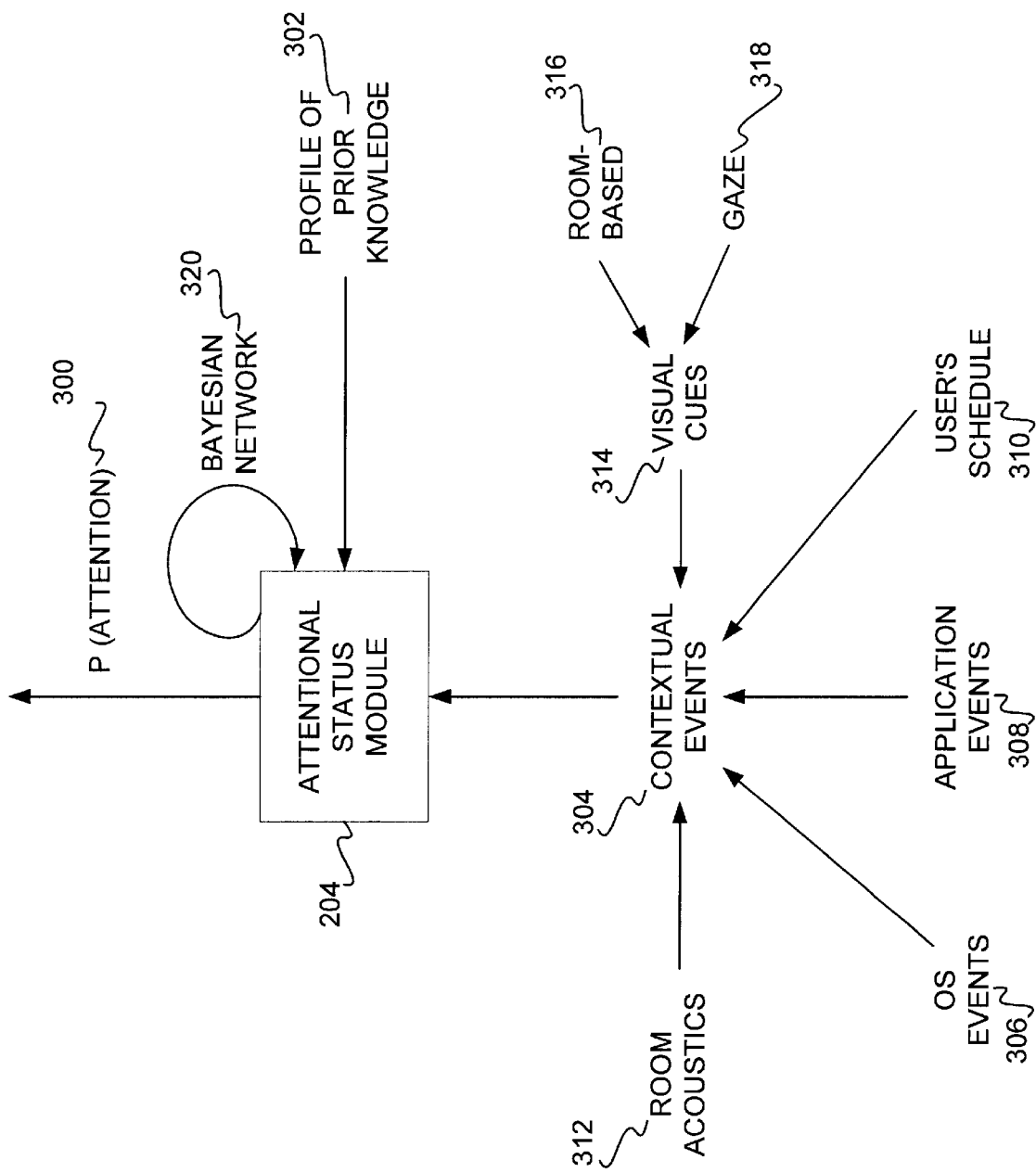
FIG. 3 is a diagram of the attentional status module of FIG. 2 in more detail, according to one embodiment of the invention.

Referring first to FIG. 3, the attentional status module 204 ultimately generates a probability distribution over different states of attention 300. In one embodiment, the output of the attentional status module can be the single availability probability—the probability that the user is in a state that makes receipt of an alert or notification a low cost event, which as described is defined in one embodiment as the probability that the user is receptive to receiving an alert or is actively seeking the peripheral information associated with one or more alerts More generally, the probability 300 is defined as the probability distribution over a user's focus of attention. The invention is not particularly limited by the manner in which the probability 300 is generated.

The probability 300 is generated in one embodiment by considering a profile of prior knowledge 302, as well as one or more contextual events 304. The profile 302 includes a user profile directly specified by the user or assessed from the user, or of knowledge that has been learned by observing user's responses to previous alerts, in one embodiment. That is, the profile 302 in this embodiment includes how the user has responded previously to alerts made. If the user has been receptive to alerts in the past, for example, this may increase the probability 300, while if the user has not been receptive to alerts in the past, this may decrease the probability 300.

The contextual events 304 includes computer information as well as external information. Operating system events 306 may include information such as whether the user has been focused on a single application and is typing quickly on the keyboard, which may indicate that the user is busy. Other operating system events 306 include the speed and periodicity of movements of the mouse, various patterns of scrolling and dwelling on windows containing rendered text, and high-level patterns of transition among multiple application types. Application events 308 may include whether a user has been searching through menus that allow for access of different application functionalities, information about the kind of online help being reviewed by the user, and indications of the sequence of refinements being employed during a process of searching large corpora of documents. For example, if a user is in a spreadsheet program, and has been modifying the spreadsheet and/or entering data recently, then the user is generally busy in this application. Other computer information include the user's schedule 310, which can be gleaned from a calendaring or appointment program. This information may indicate whether the user has a deadline looming in an hour, is having an important meeting, is traveling, or is in the middle of a conference, etc.

External information includes the ambient acoustical energy in the room 312 and visual cues 314. The room acoustics 312 can indicate if there are other people in the room besides the user, suggesting that the user is busy talking to these other people. Information considered by the attentional-status module can include an analysis of in the room, including a consideration of such preprocessing stages as an analysis of the pattern of audio energy over time and a Fourier analysis of the frequency contour of the audio spectrum. The visual cues 314 can include both room-based visuals 316, as well as gaze 318. The room-based visuals 316 can be used to determine whether the user is even in the room with the computer, as well as whether the user is alone in the room or other people are present, too. The gaze 318 can be used to determine whether the user is attentive to the computer, or whether the user is looking at a book, has his or her head turned to one side, etc. Thus, the one or more contextual events include audio information as well as visual information.

Thus, the contextual events 304 and/or the profile 302 are used to determine the probability distribution over a user's focus of attention, or of the single availability probability that a user is open to or actively seeking notifications. As has been stated, the invention is not limited to the manner by which this probability distribution over the user's focus of attention or a single availability probability over receptivity to alerts is generated. In one embodiment, however, a probabilistic model, such as a Bayesian network 320, as known within the art, is utilized. The use of a Bayesian network to generate a probability distribution over a user's focus of attention and the probability distribution over the period of time until the user becomes available for reviewing notifications at minimal cost is now described in more detail.

In general, it is noted that alerts provide information at a cost of interruption and obstruction of valuable screen real estate. Thus, it is assumed that the cost of interruption depends on a user's current focus of attention. A Bayesian network can therefore be used to infer a probability distribution over a user's focus of attention and task. In one embodiment, a set of mutually exclusive and exhaustive states of attention focus can be identified.

Figure 4:
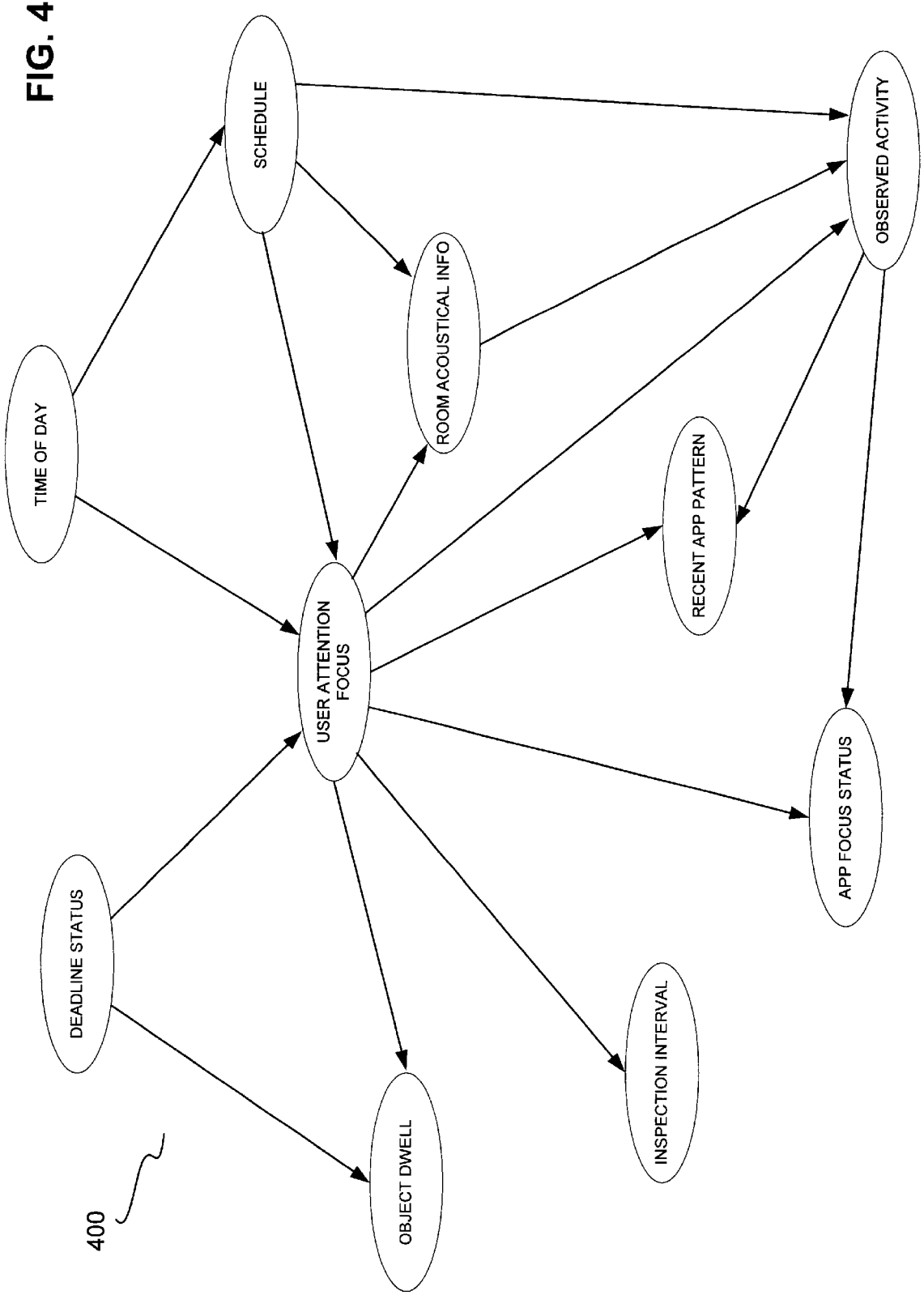
FIG. 4 is a diagram of a Bayesian model of a user's focus of attention, according to one embodiment of the invention.

Referring to FIG. 4, a diagram of a Bayesian model 400 of a user's focus of attention is shown. The states of the variable Focus of Attention refer to desktop and nondesktop contexts, as have been described. Attentional contexts considered include Situation awareness—catching up, Non-specific background tasks, Focused content generation or review, Light content generation or content review, Browsing documents, Meeting in office, Meeting out of office, Private time, Family, personal focus, Causal conversation, and Travel.

A attentional status and location are influenced by the user's scheduled appointments, the proximity of deadlines, and the time of day. A attentional status and location influences potentially observable desktop activity and proximal conversation. Variables representing these observations are included in the Bayesian model 400, as shown in FIG. 4. Desktop evidence considered in the Bayesian model includes states that represent various classes of mouse and keyboard activity and patterns of application usage (e.g., Email-centric, Word-processor centric, etc.). A Room acoustics variable represents a coarse analysis of audio in the user's office. In real-time use, information from an online calendar and time of day, as well as desktop activity and room acoustics are continuously monitored to provide updates to the probability distribution over the target variable, User Attentional Focus.

Peripheral Information Notification and Alerts Module

In this section of the detailed description, the peripheral information notification and alerts module is described in more detail, according to one embodiment of the invention. The description is made with reference to FIG. 5, which is a diagram of the peripheral information notification and alerts module 202 shown in more detail, according to one embodiment of the invention.

Figure 5:
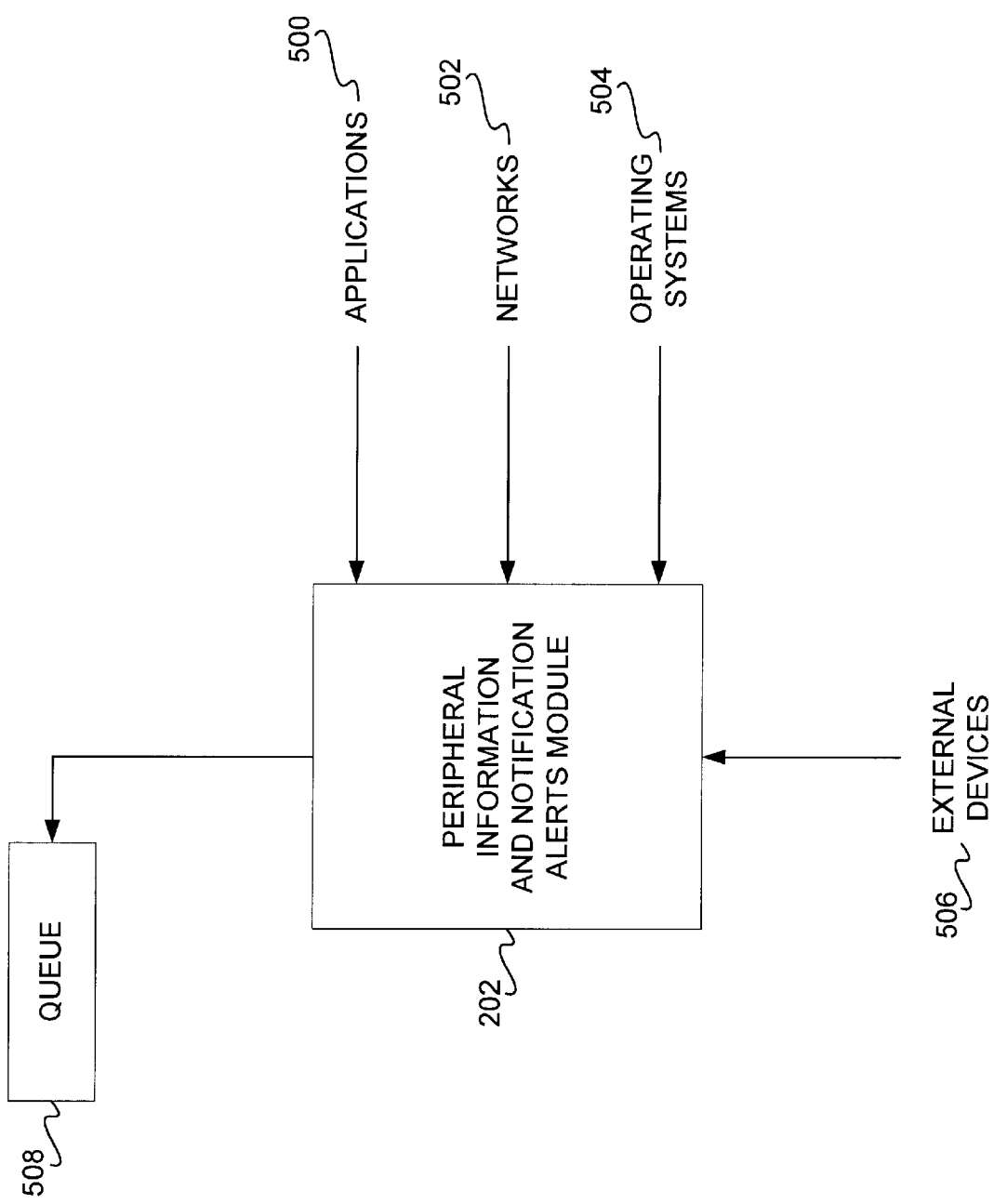
FIG. 5 is a diagram of the peripheral information and notification alerts module of FIG. 2 in more detail, according to one embodiment of the invention.

Referring to FIG. 5, the peripheral information notification and alerts module 202 receives desirably all generated alerts. That is, rather than a specific application program alerting the user in its own manner, the program instead passes along its alert to the module 202. In this manner, alerts management can then be conducted in a centralized fashion by a system according to an embodiment of the invention. In one embodiment the peripheral information notification an alerts module provides a set of standardized interfaces to applications, some of which may be written as "plug-ins" explicitly to provide auxiliary information based on inference about a attentional status.

The invention is not particularly limited by the sources of the alerts. However, common alerts include, in one embodiment, alerts generated by application program 500, computer networks 502 (including, for example, alerts received over such networks from other computers), and operating systems 504. Furthermore, in one embodiment, the alerts received by the module 202 also include alerts generated by external devices 506, such as telephones, televisions, appliances, etc. The invention is not so limited.

In one embodiment, the module 202 passes along the alerts it receives through a queue 508. The queue 508 may be of a predetermined depth so as to ensure that all alerts that can conceivably be generated within a particular length of time can be stored in the queue 508. The invention is not so limited, however.

Notification Decision-Making Module

In this section of the detailed description, the notification decision-making module is described in more detail, according to one embodiment of the invention. The description is made with reference to FIG. 6, which is a diagram of the notification decision-making module 206 shown in more detail, according to one embodiment of the invention.

Figure 6:
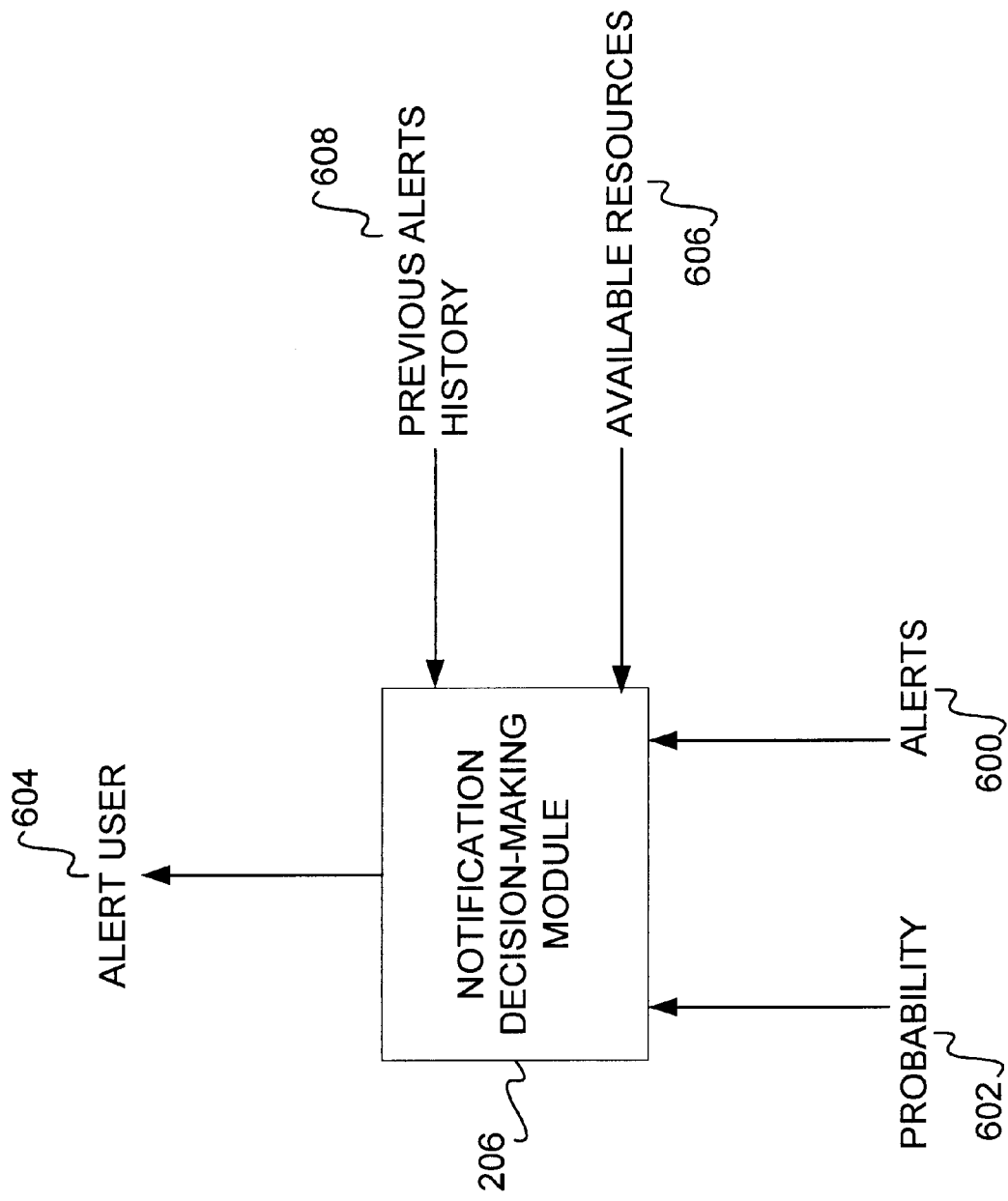
FIG. 6 is a diagram of the notification decision-making module of FIG. 2 in more detail, according to one embodiment of the invention; and, FIG. 7 is a flowchart of a method according to an embodiment of the invention.

Referring now to FIG. 6, the notification decision-making module 206 alerts the user of the alerts 600 received from the peripheral information notification and alerts module, based on the probability distribution over a attentional status or the availability probability 602 from the attentional status module, as represented by 604. The module 206, more specifically, determines the "how" and "when" of user alerting—that is, the manner by which the user should be alerted, for example, in a visual and/or an audio manner, and when the user should be alerted. In making this determination, the module 206 desirably utilizes a determination of available resources 606, as well as a history of previous alerts 608. The available resources 606 indicates whether the user has a sound card on his or her computer, for example, by which to render audible audio alerts; the type of display on the computer and available screen real estate thereon, for example, which can be used to indicate whether the user has open screen space for a visual alert; etc.; the invention is not so limited. The previous alerts history 608 indicates the types of alerts that have been made to the user in the past, as well as the frequency of the alerts—such that the user is not overwhelmed by additional alerts, if many recent alerts have been made, for example.

The invention is not particularly limited to the manner by which the module 206 determines how and when an alert should be made to the user. In one embodiment, how an alert should be made is dependent on user preference as to the underlying information of an alert (for example, electronic mail, versus a telephone alert, etc.), and also desirably on the priority of the alert. Each manner of how an alert is made in one embodiment has an associated cost of distraction, which further assists in determining when or whether an alert should be made. The invention is not particularly limited as to the manner by which alerts can be made; as has been described, in one embodiment, the alerts can be made in an audio and/or a visual manner. Furthermore, in other embodiments of the invention, alerts are made in one or more of the manners described in the cofiled, copending and coassigned applications entitled "Downloading Prioritized Messages in Limited Bandwidth Environments" [docket no. 1018.019US1], "Integration of a Computer-Based Message Priority System with Mobile Electronic Devices" [docket no. 1018.026US1], "Methods for Routing Documents based on a Measure of Criticality" [docket no. 1018.027US1], and "Methods for Display, Notification, and Interaction with Prioritized Messages" [docket no. 1018.028US1], which are all hereby incorporated by reference.

In one embodiment, the determination as to when or whether an alert is provided to the user is made by inferring the expected cost of transmitting an alert to the user, and by inferring the informational benefits of the alerts. In other words, the utility of relaying information contained in an alert determines whether or when an alert should be made, where the utility is the difference between the expected costs and benefits of the information provided by the alert. This is now described in more detailed, with specific reference to the case involving email messages and alerts thereof, although those of ordinary skill within the art can appreciate that the invention is not so limited.

In the general case, there are different dimensions of cost associated with alerts. Alerts can take the form of audio, visual or a combination of audio and visual notifications. Beyond the cognitive cost of the immediate distraction associated with an alert, visual alerts can obstruct content already at the center of a attentional status. Thus, it is useful to decompose the cost of an alert into the cognitive cost associated with an interrupt and the cost of obstruction of important display real estate. The latter dimension of cost can depend on the details of the design of the visual alert, as well as the status of displayed information associated with the main task at hand. For example, a design that overlays a graphical alert over content at the center of a attentional status and that requires a user to take action to remove the display alert is more costly than an alert that appears and disappears autonomously in a timely and elegant manner. In one embodiment, the cost of interruption and the cost of obstruction are merged into a single cost, however. (It is noted that the terms document and text are used interchangeably herein and should be construed as interchangeable as well.)

First, a set of alerting outcomes $A_i$, $F_j$, are considered, which represents the situation where alert $A_i$ occurs when a user is in the state of attentional focus $F_j$. To assess the cost for each alerting outcome, a cost function of the form $C^a(A_i, F_j)$ is used, which refers to the cost of being alerted via action $A_i$ when the user is in attentional state $F_j$. Given uncertainty about a user's state of attention, the expected cost of alerting (ECA) a user with action $A_i$ is, $$ECA = \sum_j C^a(A_i, F_j)p(F_j | E^a)$$

where $E^a$ is evidence relevant to inferring a attentional status focus, such that $p(F_j|E^a)$ is determined by the attentional status module, as has been described, for example, through the use of a Bayesian network.

Next, the cost of delayed action under uncertainty is considered. This description is specifically made with reference to email messages having an assigned priority, although those of ordinary skill within the art can appreciate that the invention itself is not so limited. For example, such email messages may be received by the peripheral information notification and alerts module, where the messages have a priority over a predetermined threshold. The assignment of priority to email messages is specifically described in the cofiled, copending and coassigned case entitled "Method for Automatically Assigning Priorities to Documents and Messages" [docket no. 1018.025US1], which is hereby incorporated by reference. A summary of how priority is assigned to email messages in one manner, by assignment of email messages to particular criticality classes, is provided in a further section of the detailed description.

In general, the priority of a message can be defined as the expected cost of delayed action associated with reading the message, or ECDA. ECDA is the difference in the expected value of taking immediate ideal action (action at time $t_0$) and delaying the ideal action until some future time t. Given a probability distribution over time criticality, p(H|E), the expected cost of delayed action for messages can be determined as, $$ECDA = \max_A \sum_j u(A_i, H_j, t_0) p(H_j | E) - \max_A \sum_j u(A_i, H_j, t) p(H_j | E)$$

ECDA thus provides a starting point for reasoning about the cost of delayed review of messages. The utility of reading an email message typically diminishes with delay in reviewing the message. Costs of delayed review of messages can also be significant with communications about coordination, for example, of meetings and deadlines. Thus, the cost of delayed review of messages can be represented by loss functions that operate on the amount of time remaining until the meeting being communicated about occurs. After a meeting has passed, many options for action are eliminated. Therefore, losses incurred with delays in the review of the message may be smaller for periods of delay coming after the occurrence of a meeting at the core of an email message.

In one embodiment, ECDA is adapted to the problem of ideal alerting about email messages by considering the probability that a mail message is a member of one of several criticality classes. This avoids assigning specific priorities to email messages by bypassing explicit consideration and representation of actions. In one embodiment, we assume that each criticality class is associated with a time-dependent cost function, describing as a constant rate at which losses accrue with delayed review of a message. In the general case, however, the costs of delayed review for each criticality case can be a nonlinear function of the time describing delays in reviewing messages, $t_0$ is referred to as the moment the email arrives, and the expected cost for delays in review is determined until time t.

Thus, assuming that each email message is in one of n criticality classes, it can also be assumed that each class is associated with a criticality-class—a specific constant rate of loss that describes the cost of delayed review. Thus, using $C^d$ to represent a time-dependent rate of loss, we compute an expected cost of delayed review (ECDR) for messages, $$ECDR = \sum_i C^d(H_i)(t - t_0) p(H_i | E^d)$$

where $t_0$ represents the time a message arrives, t is the time the message is reviewed, and $E^d$ is the evidence used to infer a probability distribution over the criticality class of a new incoming email message. The probability distribution would thus be obtained from the attentional status module in one embodiment of the invention. We refer to the constant rate of loss associated with the delayed review of messages as the expected criticality (EC) of a message, $$EC = \sum_i C^d(H_i) p(H_i | E^d)$$

Now, ideal alerting about communicated information is described. It is noted that users typically review email periodically even when using systems that are configured to suppress the active emission of alerts about incoming email. Therefore, the time between periods of reviewing new email in the absence of explicit alerts, which is the time until the user becomes "available" for reviewing the information, is referred to as the inspection interval, or I. The inspection interval is influenced by multiple factors, including the location of a user and the user's focus of attention. A Bayesian network, as known in the art, can be used to infer a probability distribution over the inspection interval based on influencing variables. For example, the variable Inspection Interval can be influenced by the variables User Attentional Focus and Deadline Status, as is shown in the previously described diagram of FIG. 4.

The expected cost loss associated with reviewing email in an alert-free setting, given a probability distribution over the inspection interval, is $$ECDR' = \sum_j p(I_j) t(I_{t-1} + I_j - t_0) \sum_i C^d(H_i) p(H_i | E^d)$$

where $t_{I-1}$ is the time of last access, $t_0$ is the time a message has arrived, and $I_j$ is the inspection interval.

The expected value of transmitting g an alert (EVTA) about a message at the present moment t before a user reviews the email, also referred to as the expected value of transmitting an alert, is the increase in the expected utility with being informed about the message at t versus at the time it is expected that the user will access the mail in the absence of an alert about the message. Thus, $$EVTA = \sum_j p(I_j)(t_{I_{-1}} + I_j - t_0) \sum_i C^d(H_i) p(H_i | E^d) - \sum_i (t - t_0) C^d(H_i) p(H_i | E^d)$$

A system according to one embodiment of the invention, therefore, relays information about a message—that is, informs the user of an alert—when the net value of the alert (NEVA) is positive. This is the case when the EVTA dominates the current cost of distribution for the type of alert under consideration,

NEVA=EVTA−ECA.

In one specific embodiment of the invention, information from several messages are grouped together into a single compound alert, which can raise the value of the content revealed under the guise of a single, but potentially more complex, distraction. Reviewing information about multiple messages in an alert can be more costly than an alert relaying information about a single messages. Such increases in distraction can be represented by making the cost of an alert a function of its informational complexity. It is assumed that the EVTA of an email message is independent of the EVTA of the other email messages. EVTA($M_i$,t) is used to refer to the value of alerting a user about a single message $M_i$ at time t and ECA(n) is used to refer to the expected cost of relaying the content of n messages. Thus, multiple messages can be considered by summing together the expected value of relaying information about a set of n messages, $$EVTA = \sum_{i=1}^{n} EVA(M_i, t) - ECA(n).$$

It is noted that assuming independent in the value of reading distinct messages may, however, lead to over estimations of the value of the multiple-message alert because strings of messages received in sequence may refer to related content.

Therefore, given inferred probability distributions over a attentional status focus and inspection interval, an assessment of the costs of distracting a user with alerts and the time criticality of incoming messages, NEVA can be employed to continue to reason about the costs versus the benefits of alerting users with summarizing information about the content of newly arriving email messages.

In another embodiment of the invention, transmission costs are also included in NEVA, such that the equation is changed from

NEVA=EVTA−ECA to

NEVA=EVTA−ECA−TC where TC is the transmission cost associated with the alert (e.g., the cost of the page or the cell phone cost). The influence of calendar events on ECA for the case of a computer relaying a message to a cell phone is quite salient. That is, the online calendar can give the system an idea for how bad an interruption would be via a mobile device such as a cell phone or a pager—that is how big the ECA would be per the importance of the current meeting that the user is attending—and perhaps wait until the ECA goes down, e.g., when the meeting ends. Also, the system in one embodiment checks to see if the user is around or not at the desktop system before making a decision that the only way to reach the user is to "render" the notification via the cell phone.

Assigning Messages to Criticality Classes

As has been described in the preceding section, in one embodiment of the invention, the system determines when to provide an alert to a user based on the priority of the underlying information—for example, the underlying priority of an email message. As has also been described, in one embodiment, an email message alert arrives at the peripheral information notification and alerts module with an already assigned priority, for example, as assigned in the manner described in the copending, cofiled and coassigned application entitled "Method for Automatically Assigning Priorities to Documents and Messages" [docket no. 1018.025US1], which has already been incorporated by reference. However, a message may also be assigned a criticality class, as has been described. Therefore, in this section of the detailed description, a summary of how a message may be assigned a criticality class according to one manner is described.

An email criticality classification can be based on text classification methods, as known within the art. The text classification methodology may employ different phases of analysis, including feature selection, classifier construction, and mapping classifier outputs to measures of beliefs that an email message is a member of each criticality class. In one embodiment, the text classification methodology is based on a Bayesian learning approach, as described in the reference M. Sahami, S. Dumais, D. Heckerman, E. Horvitz, A Bayesian Approach to Junk E-Mail Filtering, AAAI Workshop on Text Classification, July 1998, Madison, Wis., AAAI Technical Report WS-98-05, which is hereby incorporated by reference. In other embodiments, the text classification methodology is based on a linear Support Vector machine methodology, as described in the following references: the coassigned patent, U.S. Pat. No. 5,864,848, issued Jan. 26, 1999, which is hereby incorporated by reference; the previously filed and coassigned case entitled "METHODS AND APPARATUS FOR BUILDING A SUPPORT VECTOR MACHINE CLASSIFIER," serial no. 09/055,477, filed on Apr. 6, 1998, which is also hereby incorporated by reference; and, the reference J. Platt, Fast Training of Support Vector Machines using Sequential Minimal Optimization, MIT Press, Baltimore, Md., 1998, which is also hereby incorporated by reference.

Support Vector Machines build classifiers by identifying a hyperplane that separates a set of positive and negative examples with a maximum margin. In the linear form of SVM that is employed in one embodiment, the margin is defined by the distance of the hyperplane to the nearest positive and negative cases for each class. Maximizing the margin can be express as an optimization problem and search and optimization thus lay at the core of different SVM-based training methods. A post-processing procedure described in the Platt reference is used that employs regularized maximum likelihood fitting to produce estimations of posterior probabilities. The method fits a sigmoid to the score that is output by the SVM classifier.

A set of criticality classes is created, and a time-dependent cost function is assessed for each class. A training set for analysis by the SVM is built by the classifier-construction procedure by manually partitioning a corpus of sample messages into the different criticality classes. Given a training corpus, the text classification methods first apply feature-selection procedures that attempt to find the most discriminatory features. This process employs a mutual-information analysis. Feature selection can operate on single words or higher-level distinctions made available, such as phrases and parts of speech tagged with natural language processing.

Feature selection for text classification typically performs a search over single words. Beyond the reliance on single words, domain-specific phrases and high-level patterns of features are also made available. Special tokens can also enhance classification. The quality of the learned classifiers for email criticality can be enhanced by inputting to the feature selection procedures handcrafted features that are identified as being useful for distinguishing among email of different time criticality. Thus, during feature selection, single words as well as special phrases and symbols that are useful for discriminating among messages of different levels of time criticality are considered.

Tokens and patterns of value in identifying the criticality of messages include such distinctions as:

Sender: single person versus an email alias, people at a user's organization, organizational relationship to user, names included on a user constructed list, people user has replied to Recipients: sent only to user, sent to a small number of people, sent to a mailing list Time criticality: inferred time of an implied meeting, language indicating cost with delay, including such phrases as "happening soon," right away," as soon as possible," "need this soon," "right away," "deadline is," by time, date," etc.

Past tense: phrases used to refer to events that have occurred in the past such as, "we met," "meeting went," "took care of," "meeting yesterday," etc.

Future tense: phrases used to refer to events that will occur in the future including "this week," "Are you going to," "when are you," etc.

Coordination: language used to refer to coordinative tasks such as "get together," "can we meet," "coordinate with," etc.

Personal requests: phrases associated with direct requests for assistance, including sentences ending with questions marks, "will you," "are you," "can you," "I need," "take care of," need to know,"etc.

Importance: language and symbols referring to importance including the presence of an explicit high or low priority flag, and such phrases as "is important," is critical," etc.

Length of message: size of new component of a message (excluding forwards)

Presence of attachments: noting the inclusion of documents in the email

Time of day: the time a message was composed

Signs of junk email: patterns such as percent nonalphanumeric characters, and pornographic content, marketing phraseology such as "Free!!," "Only $," "Limited offer," etc.

In addition, an embodiment allows for the creation of features as Boolean combinations of features such as these, including, for example, endowing the system with the ability to identify the feature defined as a short note, containing at least one question, from an individual one or more links above the user in the org chart, or a message sent directly to me involving one or more phrases referring to time criticality from some close to me in the org chart etc. etc., Method In this section of the detailed description, a computer-implemented method according to an embodiment of the invention is described. The method may be performed, for example, by a system according to an embodiment of the invention, as has already been described. The computer-implemented method is desirably realized at least in part as one or more programs running on a computer—that is, as a program executed from a computer-readable medium such as a memory by a processor of a computer. The program is desirably storable on a machine-readable medium such as a floppy disk or a CD-ROM, for distribution and installation and execution on another computer.

Figure 7:
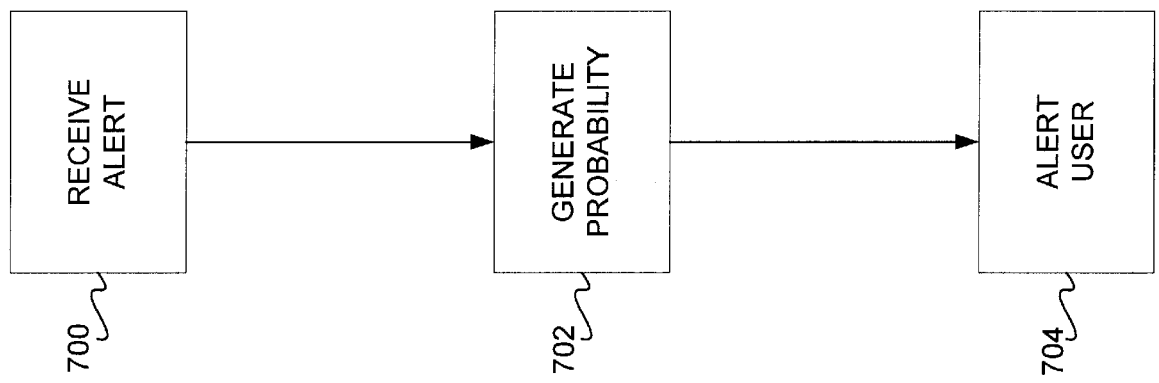

Referring to FIG. 7, a flowchart of a method according to an embodiment of the invention is shown. In 700, alerts are received, for example, by a peripheral information notification and alerts module as has been described. The alerts may be from application programs, operating systems, networks, external devices, etc.; the invention is not so limited. In 702, a probability is generated, for example, by a attentional status module as has been described. The probability may be a probability distribution in one embodiment. The generation is based in one embodiment on a profile of prior knowledge, and contextual events; the invention is not so limited. Finally, in 704, the user is alerted of one or more of the alerts received in 700, based on at least the probability determined in 702—for example, by an notification decision-making module as has been described. In one embodiment, 702 includes determining how and when a specific alert is to be made to the user.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

I claim:

1. A computerized system comprising: "an attentional status module to generate one or more probabilities about a user's focus of attention; "a peripheral information notification and alert module to receive alerts; and, "a notification decision-making module to alert the user of the alerts based on the probabilities inferred about a user's focus of attention."

2. The system of claim 1, wherein the one or more probabilities comprises a probability distribution.

3. The system of claim 1, wherein the one or more probabilities comprises a probability distribution over a set of states considered to be a mutually exclusive and exhaustive set of foci of attention of the user.

4. The system of claim 1, wherein the attentional status module provides a single availability probability representing a likelihood that the user can receive at least one of alerts, notifications, and peripheral information at no greater than minimal cost.

5. The system of claim 1, wherein the attentional status module provides one or more probabilities about the focus of attention of the user and an estimation of a period of time until attentional status will become available to receive notifications or alerts at no greater than minimal cost.

6. The system of claim 1, wherein the attentional status module provides one or more probabilities about the focus of attention of the user and an estimation of the period of time until the user will seek to actively review stored information, notifications, or alerts without prompting.

7. The system of claim 1, wherein the attentional status module is to generate the one or more probabilities based on at least one of: one or more contextual events, and a user profile.

8. The system of claim 7, wherein the user profile comprises a user profile of knowledge of responses of the user to previous alerts.

9. The system of claim 7, wherein the one or more contextual events comprise at least one of operating system events and application events.

10. The system of claim 7, wherein the one or more contextual events comprise information from a schedule of the user.

11. The system of claim 7, wherein the one or more contextual events comprise at least one of audio information and visual information.

12. The system of claim 1, wherein the attentional status module is to generate the one or more probabilities by utilizing a probabilistic model.

13. The system of claim 1, wherein the attentional status module is to generate the one or more probabilities based on a Bayesian network.

14. The system of claim 1, wherein the peripheral information notification and alerts module is to receive alerts from at least one of: one or more applications, one or more networks, one or more operating systems.

15. The system of claim 1, wherein the peripheral information notification and alerts module is to receive alerts from one or more external devices.

16. The system of claim 1, wherein the notification decision-making module is to alert the user of the alerts also based on a history of previous alerts.

17. The system of claim 1, wherein the notification decision-making module is to alert the user of the alerts also based on available system resources.

18. The system of claim 1, wherein the notification decision-making module is to alert the user in a visual manner of the alerts.

19. The system of claim 1, wherein the notification decision-making module is to alert the user in an audio manner of the alerts.

20. The system of claim 1, wherein the notification decision-making module is to alert the user on a mobile device.

21. The system of claim 1, wherein the notification decision-making module is to alert the user on the mobile device based on NEVA=EVTA−ECA−TC, where NEVA is a net expected value of alert, EVTA is an expected value of alert, ECA is an expected cost of alert, and TC is a transmission cost.

22. A computerized system comprising:

"an attentional status module to generate one or more probabilities via a probabilistic model and based on at least one of: one or more contextual events, and a user profile;

"a peripheral information notification and alert module to receive alerts from at least one of: one or more applications, one or more networks, one or more operating systems, and one or more external devices; and, "a notification decision-making module to alert the user of the alerts based on the one or more probabilities in at least one of: an audio manner and a visual manner."

23. The system of claim 22, wherein the user profile comprises a user profile of knowledge of responses of the user to previous alerts.

24. The system of claim 22, wherein the one or more contextual events comprise at least one of operating system events and application events.

25. The system of claim 22, wherein the one or more contextual events comprise information from a schedule of the user.

26. The system of claim 22, wherein the one or more contextual events comprise at least one of audio information and visual information.

27. The system of claim 22, wherein the attentional status module is to generate the one or more probabilities based on a Bayesian network.

28. The system of claim 22, wherein the notification decision-making module is to alert the user of the alerts also based on a history of previous alerts.

29. The system of claim 22, wherein the notification decision-making module is to alert the user of the alerts also based on available system resources.

30. A computer-implemented method comprising:

receiving an alert from at least one of: one or more applications, one or more networks, one or more operating systems, and one or more external devices;

generating one or more probabilities about a user's focus of attention via a probabilistic model and based on at least one of: one or more contextual events, and a user profile; and, alerting the user based on the one or more probabilities.

31. The method of claim 30, wherein alerting the user comprises alerting the user in at least one of: an audio manner and a visual manner.

32. The method of claim 30, wherein generating one or more probabilities comprises generating the ideal alerting action based on a maximum-utility decision-theoretic model.

33. The method of claim 30, wherein generating one or more probabilities comprises generating the probability based on a Bayesian network.

34. A machine-readable medium having instructions stored thereon for execution by a processor to perform a method comprising:

receiving an alert from at least one of: one or more applications, one or more networks, one or more operating systems, and one or more external devices;

generating one or more probabilities via a probabilistic model and based on at least one of: one or more contextual events, and a user profile; and, alerting the user based on the one or more probabilities.

35. The medium of claim 34, wherein alerting the user comprises alerting the user in at least one of: an audio manner and a visual manner.

36. The medium of claim 34, wherein generating one or more probabilities comprises generating the one or more probabilities based on a maximum-utility decision-theoretic model.

37. The medium of claim 34, wherein generating one or more probabilities comprises generating the one or more probabilities based on a Bayesian network.

* * * * *